United States Patent [19]
Kosugi et al.

[11] Patent Number: 6,030,044
[45] Date of Patent: Feb. 29, 2000

[54] SUPPORT STRUCTURE FOR A SEAT BACK

[75] Inventors: Ken Kosugi, Fukuroi; Takashi Matsuo, Hamamatsu, both of Japan

[73] Assignee: Suzuki Motor Corporation, Japan

[21] Appl. No.: 09/184,641

[22] Filed: Nov. 3, 1998

[30] Foreign Application Priority Data

Nov. 4, 1997 [JP] Japan .................................. 9-301849

[51] Int. Cl.⁷ .................................................. A47C 7/00
[52] U.S. Cl. ................ 297/440.16; 297/440.21; 297/463.1; 296/65.01; 296/65.09
[58] Field of Search .................. 297/440.16, 440.21, 297/463.1, 230.1, 378.13; 296/65.16, 65.09, 65.01; 248/503.1

[56] References Cited

U.S. PATENT DOCUMENTS

| | | | |
|---|---|---|---|
| 1,304,202 | 5/1919 | Richner | 296/65.09 |
| 2,815,796 | 12/1957 | Lobanoff | 296/68 X |
| 2,952,490 | 9/1960 | Pfaff | 296/65 X |
| 3,294,443 | 12/1966 | Beckman et al. | 297/369 X |
| 3,666,314 | 5/1972 | Makinen et al. | 296/66 X |
| 4,527,828 | 7/1985 | Groce et al. | 296/65.09 |
| 4,609,221 | 9/1986 | Bottcher | 296/65.09 |
| 4,888,854 | 12/1989 | Russell et al. | 296/65.09 X |
| 4,978,157 | 12/1990 | Murakami | 296/63 X |
| 5,015,026 | 5/1991 | Mouri | 296/65.09 |
| 5,080,419 | 1/1992 | Tanaka | 296/65.09 X |
| 5,536,063 | 7/1996 | Cable | 297/440.16 X |
| 5,582,453 | 12/1996 | Leuchtmann et al. | 296/65.09 |
| 5,700,058 | 12/1997 | Balagurumurthy et al. | 297/463.1 X |
| 5,855,414 | 1/1999 | Daniel et al. | 297/378.13 |
| 5,868,450 | 2/1999 | Hashimoto | 296/65.09 |
| 5,913,570 | 6/1999 | Yoshida et al. | 297/378.14 X |

FOREIGN PATENT DOCUMENTS

| | | | |
|---|---|---|---|
| 1573865 | 6/1969 | France | 297/440.16 |
| 358039535 | 3/1983 | Japan | 297/463.1 |
| 215410 | 4/1985 | Japan . | |
| 8169266 | 7/1996 | Japan . | |

Primary Examiner—Lynne H. Browne
Assistant Examiner—Brian H. Buck
Attorney, Agent, or Firm—Finnegan, Henderson, Farabow, Garrett & Dunner

[57] ABSTRACT

A support structure for a seat back to simplify attachment of the seat back to a seat hinge. The seat back has a protrusion with a top surface and a bottom surface in which is drilled an insertion hole. The hinge has an insertion member that can be inserted into the insertion hole. When the insertion member is inserted in the insertion hole, attachment holes in the seat back and in the hinge become aligned, and the two parts can be easily fastened.

6 Claims, 8 Drawing Sheets

SUPPORT STRUCTURE FOR A SEAT BACK

FIELD OF THE INVENTION

The present invention relates to a support structure for a seat back. More particularly, the present invention relates to a structure to attach the back of an automobile rear seat to a hinge.

DESCRIPTION OF RELATED ART

As shown in FIG. 9 of the attached drawings, conventional automobile seat hinges 100 comprise a pair of left and right second brackets 102, that can be attached to a seat back 101, as well as a first bracket 103 that can be attached to the floor panel. Second brackets 102, and first bracket 103 are joined together in a pivotable manner by an axle pin 104. Each of second brackets 102 is an integral body comprising an attachment member 107 in direct contact with seat back 101. Each second bracket 102 has a central bolt hole 105 and an L-shaped hook 106 that extends in the length direction of the automobile. Substantially triangular support members 108 are also part of second brackets 102. First bracket 103 is also a unitary body comprising an attachment member 110 in direct contact with the floor panel and having bolt holes 109), and a support member 111 extending upward from the lateral end of the attachment member 110. The support member 108 of the second bracket and the support member 111 of the first bracket are joined together by axle pin 104, so that they can rotate relative to each other.

A rear seat back panel 112 is positioned across the back surface of the rear seat back 101. An attachment hole 113 extends through the rear seat back panel 112 and can be aligned with the bolt hole 105 of the second bracket. An insertion hole 114 for receiving the L-shaped hook 106 is also drilled in panel 112.

To attach a seat hinge 100 having the conventional structure to a rear seat back 101, initially, the first bracket 103 is fastened to the floor panel with a bolt 115, and the hook 106 of the second bracket 102 is inserted into the insertion hole 114 of the rear seat back panel 112. Then, the rear seat back panel 112 attachment hole 113 is aligned with the bolt hole 105 of the second bracket 102. The bolt 116 is inserted into and threaded into the attachment hole 113 through the bolt hole 105. In this manner the rear seat back 101 is attached to the floor panel, which is part of the main body of the automobile, via the seat hinge 100.

Hook 106 is formed by press-bend tooling. Therefore, there is a concern about excessive variance in the gap or spacing L between the center of the bolt hole 105 and the hook 106 extending from attachment member 107 of the second bracket. If this gap L varies too much, it is possible that the gap M between the rear seat back panel insertion hole 114 and the attachment hole 113 will diverge from the aforementioned gap L, so that insertion of hook 106 in hole 114 will be impossible. By making the insertion hole 114 large, a bolt 116 can be easily inserted even if there is some variance in the dimension L.

The insertion hole 114 used in the conventional art is thus larger than the hook 106. Therefore, said hook 106 must be shifted around while being inserted into the insertion hole 114, so that the attachment hole 113 in the rear seat back panel 112 can be aligned with the second bracket bolt hole 105. Consequently, this arrangement does not facilitate alignment of the hook 106. Another problem occurs because the direction in which the hook 106 protrudes and the bolts 116 threading direction are both forward vis-a-vis the vehicle, so there is concern that the hook 106 will come unseated while the bolt is fastened. Because of these reasons it is difficult to maintain the rear seat back 101 in position while the hook 106 is inserted in the rear seat back panel insertion hole 114, unless this is done after the rear seat cushion is in place. Thus, the conventional bracket is difficult to assemble.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

The present invention was developed to address the problems described above. One objective of the present invention is thus to provide a seat back support structure which can be fastened to the back of a vehicle seat without having to maintain the seat cushion in place, because the seat hinge is held in a slot formed in the seat back, and retains the seat back in place during the assembly operation.

To obtain these results, the lower rear surface of the seat back is provided with a protrusion having an insertion hole or cavity. The base of the seat hinge is attached to the floor panel, and an insertion member is provided on the tip of the hinge for insertion into the aforementioned insertion hole. By inserting the insertion member into the insertion hole of the seat back protrusion, the seat back is vertically supported by the seat hinge. In particular, by inserting the top end of the seat hinge which is already attached to the floor panel into an opening in the lower part of the seat back protrusion, the seat back is temporarily maintained in place by the hinge while the hinge is fastened to the seat back, thus facilitating assembly of the seat.

In one embodiment of the present invention, a protrusion with a top surface and a bottom surface is provided on the rear surface of the seat back. An insertion hole is perforated in the lower surface of said protrusion. Primary attachment holes are perforated at a location below the protrusion, on the aforementioned rear surface. The base of the seat hinge is attached to the floor panel, and an insertion member designed to be inserted into the aforementioned insertion hole is provided on the tip of the hinge. Secondary attachment holes corresponding to the aforementioned primary attachment holes are perforated below the aforementioned insertion member. When the seat back is mounted, the insertion member is inserted into the insertion hole of the protrusion, so that the tip of the insertion member directly abuts from below the top surface of the protrusion. In this position, the seat back rests on the seat hinge, so that the primary and secondary attachment holes are essentially aligned in the vertical direction.

Fastening members, such as bolts, are inserted through these primary and secondary attachment holes, so that the seat back and the seat hinge are attached together. For example, threads can be tapped, or a nut can be welded within the primary attachment holes so that a threaded fastener can be used. Thus, by simply inserting the tip of the seat hinge into the seat back insertion hole, the seat back and seat hinge attachment holes can be located in the proper alignment.

In another embodiment according to the present invention, the insertion hole is formed of a width approximately equal to the width of the insertion member. The distance between the top surface of the seat back protrusion and the primary attachment holes on the seat back is approximately equal to the distance between the tip of the insertion member and the secondary attachment holes formed on the seat hinge. With this seat hinge structure, when the insertion member is introduced into the insertion hole of the seat back protrusion, the tip of the insertion member rests against the underside of the protrusion's top surface, so that the primary attachment holes and the secondary attachment holes are vertically aligned, and are also centered with respect to the vehicle width. As a result, the vertical and horizontal alignment of the primary and secondary attachment holes is performed automatically once the seat back protrusion hole is placed over the seat hinge insertion member.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
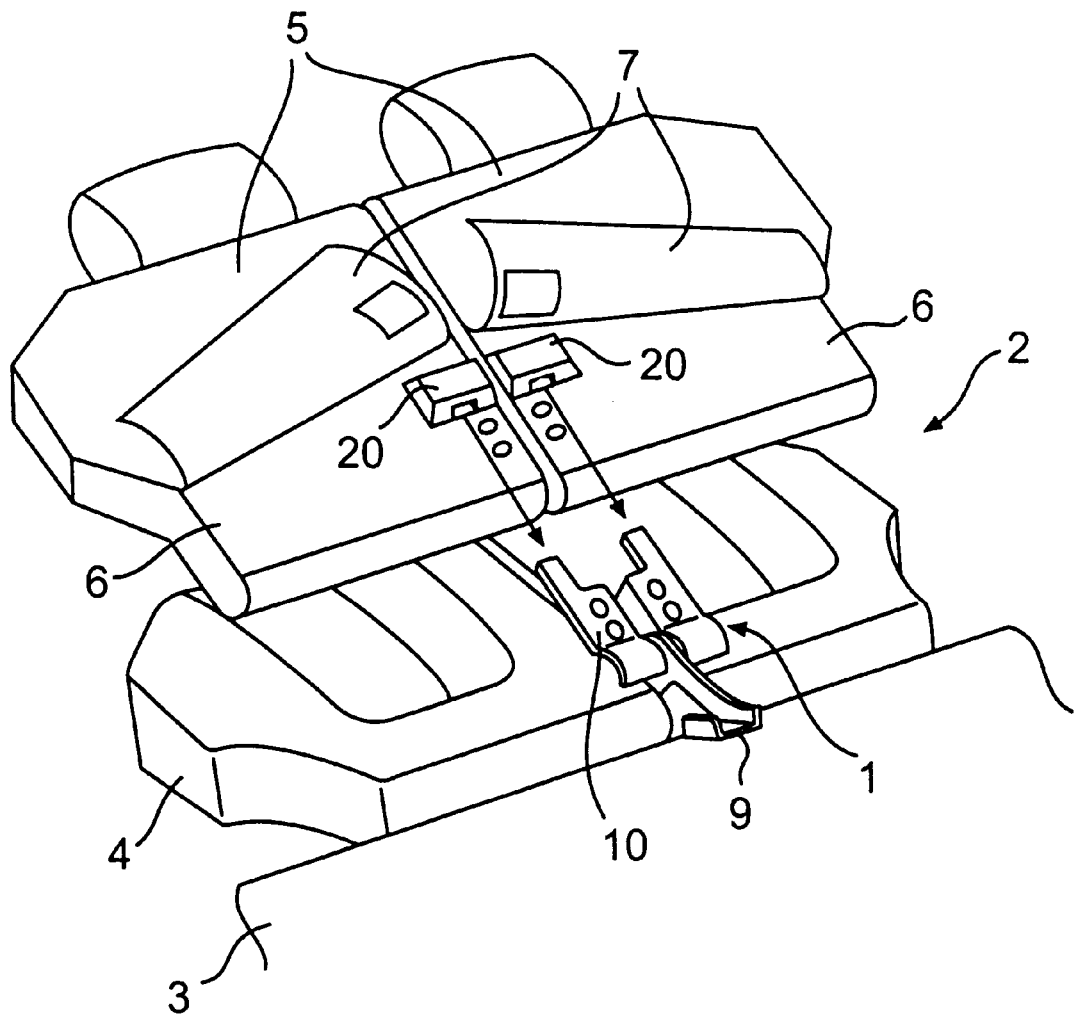
FIG. 1 is a perspective view of a seat hinge and a rear seat showing a first embodiment according to the invention.

FIG. 1 shows a seat hinge 1 and a rear seat 2 according to a first embodiment of the invention. Rear seat 2 comprises a rear seat cushion 4 placed atop the surface of the floor panel 3, and a pair of left and right rear seat backs 5 attached so they can be pivoted up or down about a seat hinge 1, which is located in the back part of said rear seat cushion 4. Rear seat backs 5 can rotate, separately and independently, about an axis along the width of the vehicle body. Also, rear seat back panels 6 are arranged or the back surfaces of said rear seat backs 5, and the surfaces of the rear seat backs 5 are covered with a covering 7.

Figure 2:
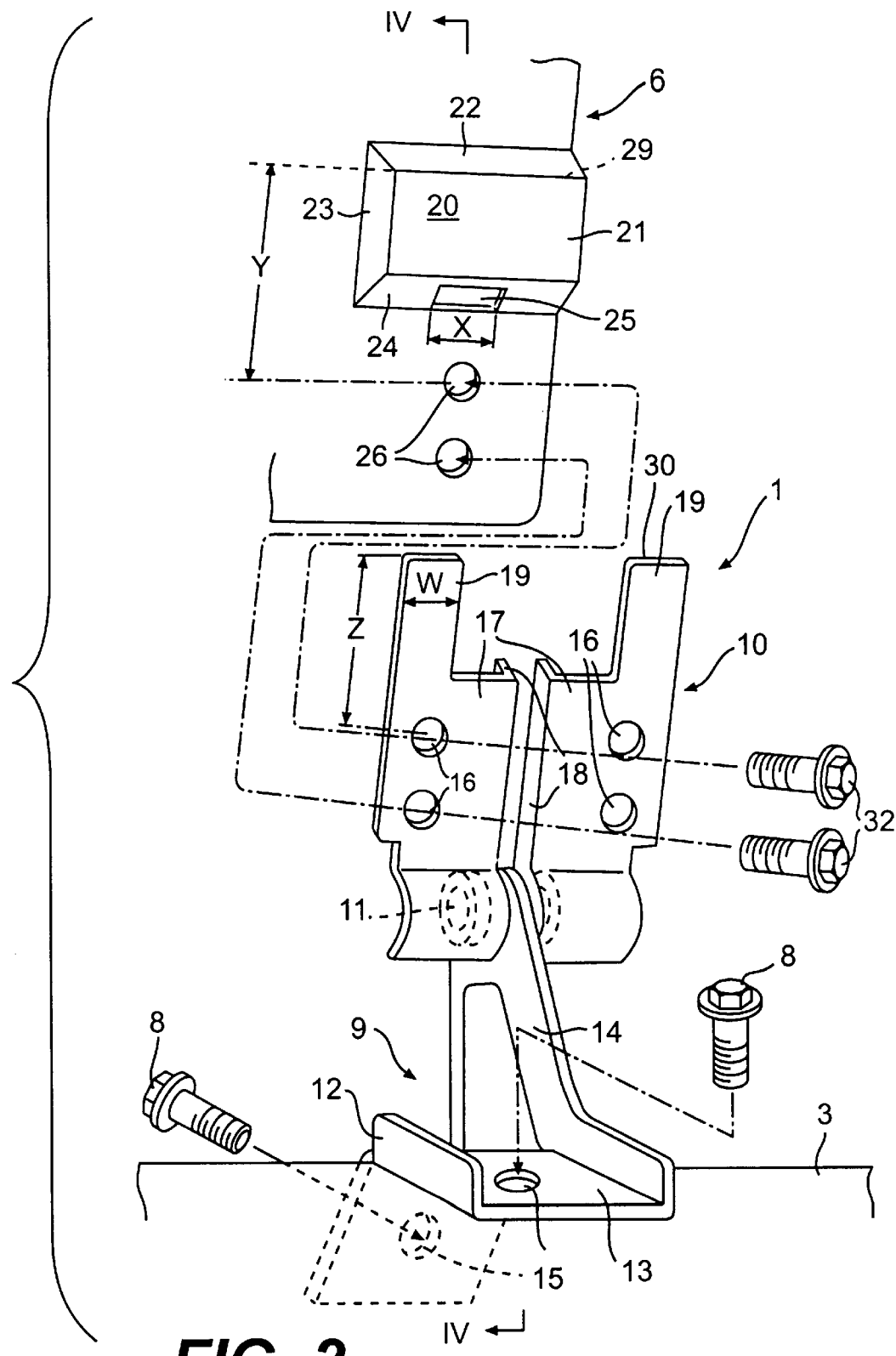
FIG. 2 is an exploded perspective view of the hinge components of FIG. 1.

A perspective enlargement of the seat hinge 1 of FIG. 1 is shown in FIG. 2. The seat hinge 1 shown in FIG. 2 is provided with a first bracket 9 secured to the floor panel 3 using bolts 8, and left and right second brackets 10 located above the first bracket 9 and attached to the first bracket 9 by a pin 11 that pivotally supports the first bracket 9 and the second brackets 10. The first bracket 9 directly touches the floor panel 3, and the lateral end of bracket 9 includes an attachment member with a flange 12 integral with support member 14 which extends upwards opposite to support member 14 from said attachment member 13. Two individual bolt holes 15 are provided in the aforementioned attachment member 13. Second brackets 10 directly touch the rear seat back panel 6 and comprise an attachment member 17 with secondary attachment holes 16 and a support member 18 positioned to extend orthogonally vis-a-vis the lateral end of said attachment member. The tip of the attachment member 17 is formed as an insertion member 19 having a width W narrower than the overall width of the attachment member 17.

A protrusion 20 extends from the rear seat back toward the rear of the vehicle and forms an integral unit with the rear seat back panel 6 at a location facing the aforementioned seat hinge. Protrusion 20 comprises rear face 21, top face 22, two side faces 23, and a bottom face 24. An insertion hole 25 is formed on bottom face 24, defining a receptacle or cavity in which insertion member 19 can be inserted. The width X of insertion hole 25 approximately equals the width W of the insertion member 19. Primary attachment holes 26 are perforated in the rear seat back panel 6 below the protrusion 20, in alignment with the secondary attachment holes 16.

Figure 3:
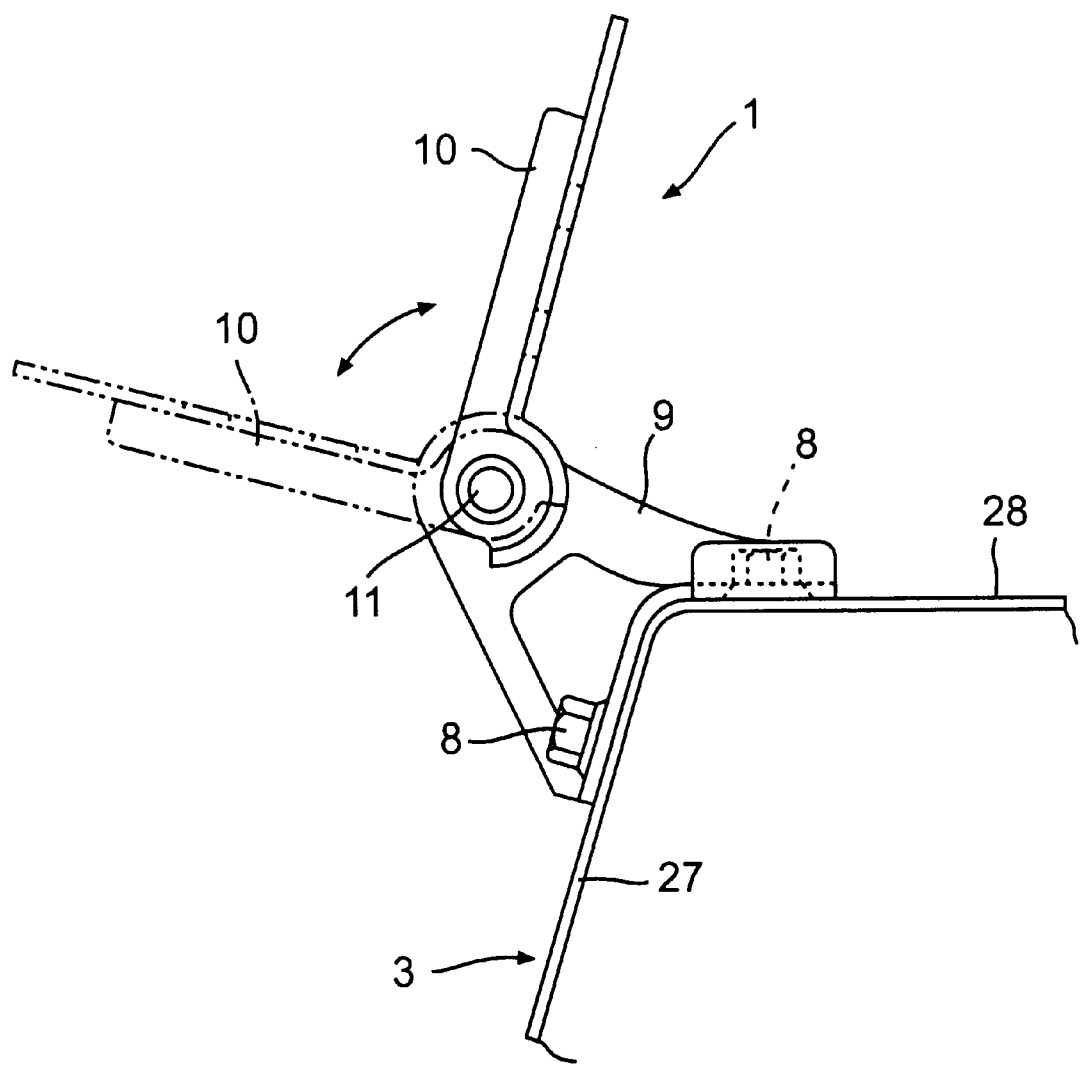
FIG. 3 is a side elevation view of the seat hinge shown in FIG. 1.

As shown in FIG. 3, the seat hinge includes a first bracket 9 that is bifurcated and affixed to the front surface 27 and the top surface 28 of the floor panel 3 by bolts 8. Second brackets 10 are designed to rotate vis-a-vis the first bracket 9, by pivoting on a pin 11.

As shown in FIG. 2, the distance Y between the top edge of the protrusion rear face that is provided on the rear seat back panel 6 and the center of a primary attachment hole 26, approximately equals the distance Z between the tip of the insertion member 19 of the second bracket 10 and the center of a secondary attachment hole 16. When the insertion member 19 of the second bracket 10 is introduced into the insertion hole 25 of the protrusion 20 on the rear seat back panel 6, the tip 30 of the insertion member 19 rests against the underside of top edge 29 of protrusion 20, so that the primary attachment holes 26 of the rear seat back panel 6 are aligned with the secondary attachment holes 16 of the second bracket 10. In addition, the distance P between the inside surface of rear face 21 and the surface of the rear seat back panel 6 approximately equals the plate thickness T of the insertion member 19 of the second bracket 10. In a preferred embodiment, nuts 31 are affixed to the back surface of the primary attachment holes 26 of the rear seat back panel 6.

To attach the rear seat back 5 to a seat hinge 1, initially, the seat hinge first bracket 9 is fastened to the floor panel 3, for example, by a bolt. Then, after the back of the rear seat 5 has been lifted above the seat hinge 1, it is lowered over the said seat hinge 1, so that the insertion hole 25 of the protrusion 20 located in the rear seat back panel 6 fits around the insertion member 19 of the seat hinge 1. After this operation, the primary attachment holes 26 of the rear seat back panel 6 are nearly aligned with the secondary attachment holes 16 of the second bracket 10, while seat back 5 is held up by seat hinge 1. Thus, by inserting bolts into these attachment holes 26, 16 and fastening them, the rear seat back 5 can be attached to the seat hinge 1.

Figure 4:
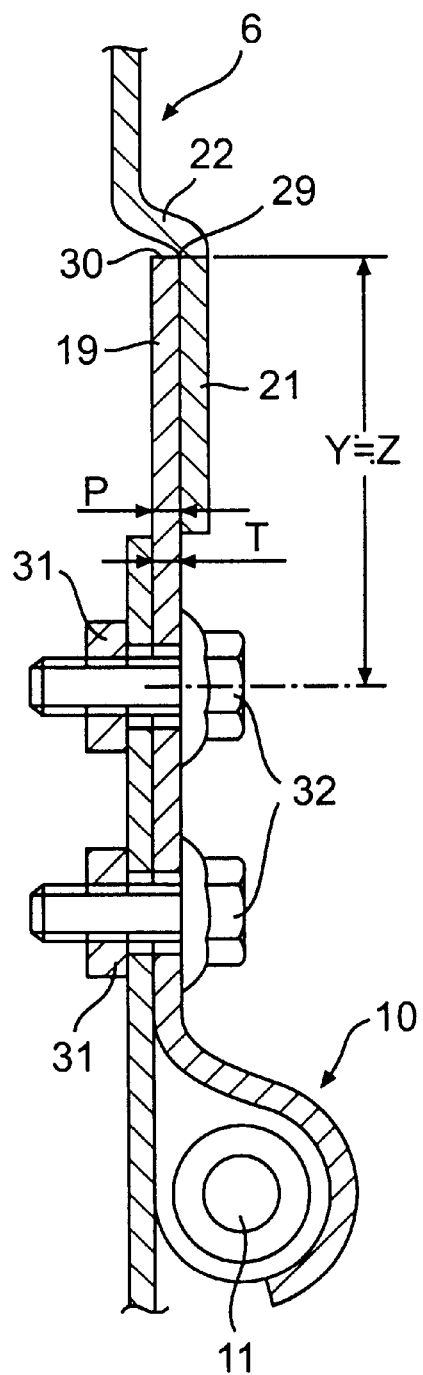
FIG. 4 is a cross section view on line IV—IV of FIG. 2.

With the structure according to the invention, as shown in FIGS. 2 and 4, the distance Y of the protrusion 20 on the rear seat back panel 6 is formed to approximately equal the distance Z of the second bracket 10. Also, because the width X of the insertion hole 25 approximately equals the width W of the insertion member 19, inserting the insertion member 19 into insertion hole 25 results in the approximate alignment of the primary attachment holes 26 of the rear seat back panel 6 with the secondary attachment holes 16 of the second bracket. The procedure of attaching the rear seat back 5 is thus simplified. In addition, the threading direction of the bolts 32 is essentially orthogonal to the direction of insertion of the insertion member, therefore tightening the bolts will not easily cause the insertion member 19 to become dislodged from the insertion hole 25.

In FIGS. 5–8, a seat hinge 33 and a rear seat 2 according to a second embodiment of the invention are shown.

Figure 5:
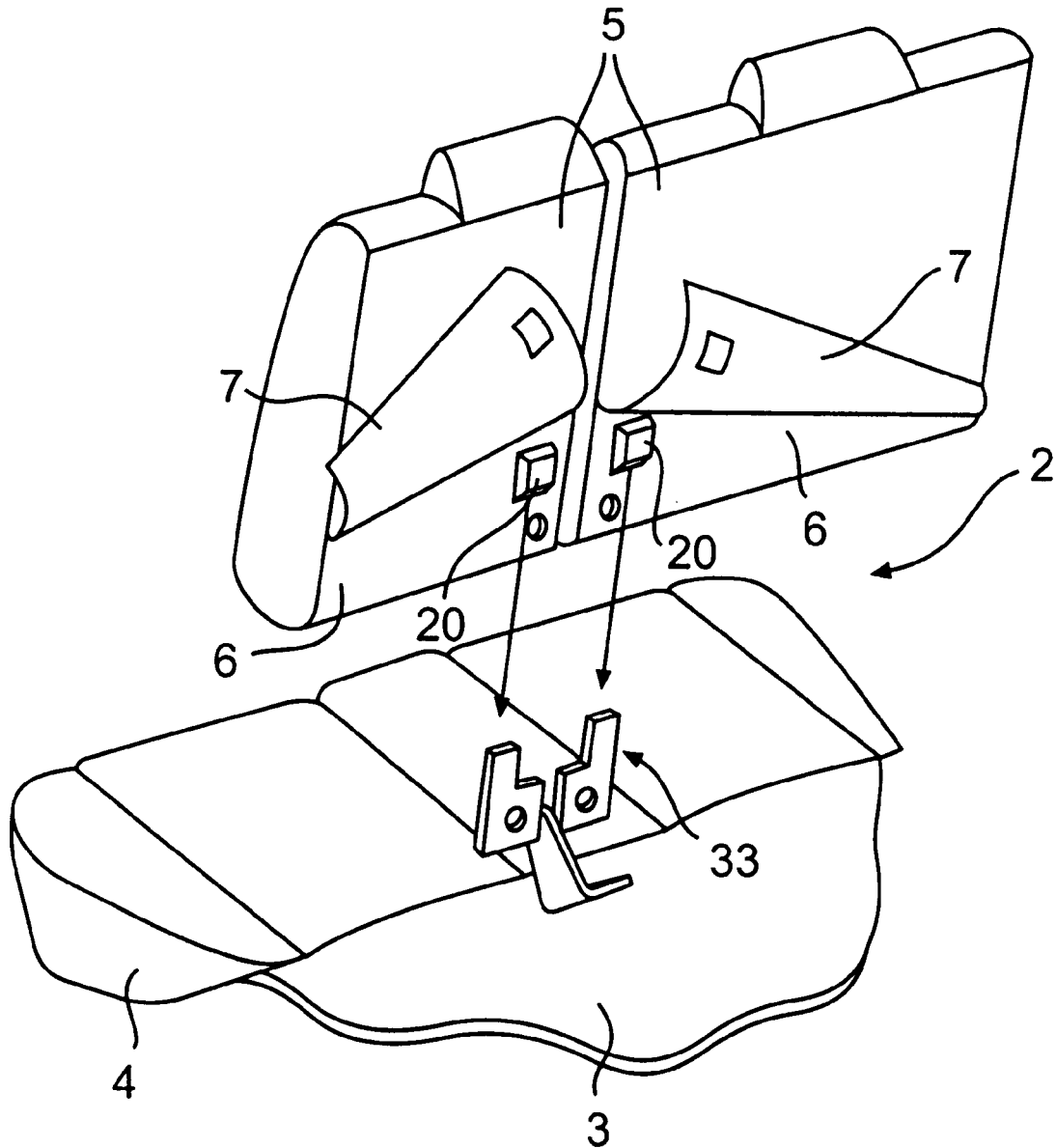
FIG. 5 is a perspective view of a seat hinge and a rear seat showing a second embodiment according to the invention.

As shown in FIG. 5, seat hinge 33 is attached to the floor panel 3 and includes insertion members 19 extending from the top of the hinge. A protrusion 20 having an insertion hole 25 is provided on the rear seat back panel of each rear seat back. By inserting the insertion member 19 into the insertion hole 25, the rear seat back 5 can be positioned and attached to the seat hinge 33. Since many components of the second embodiment are analogous to the seat hinge 1 and the rear seat 2 of the first embodiment described above, the same reference numeral are used for similar parts.

Figure 6:
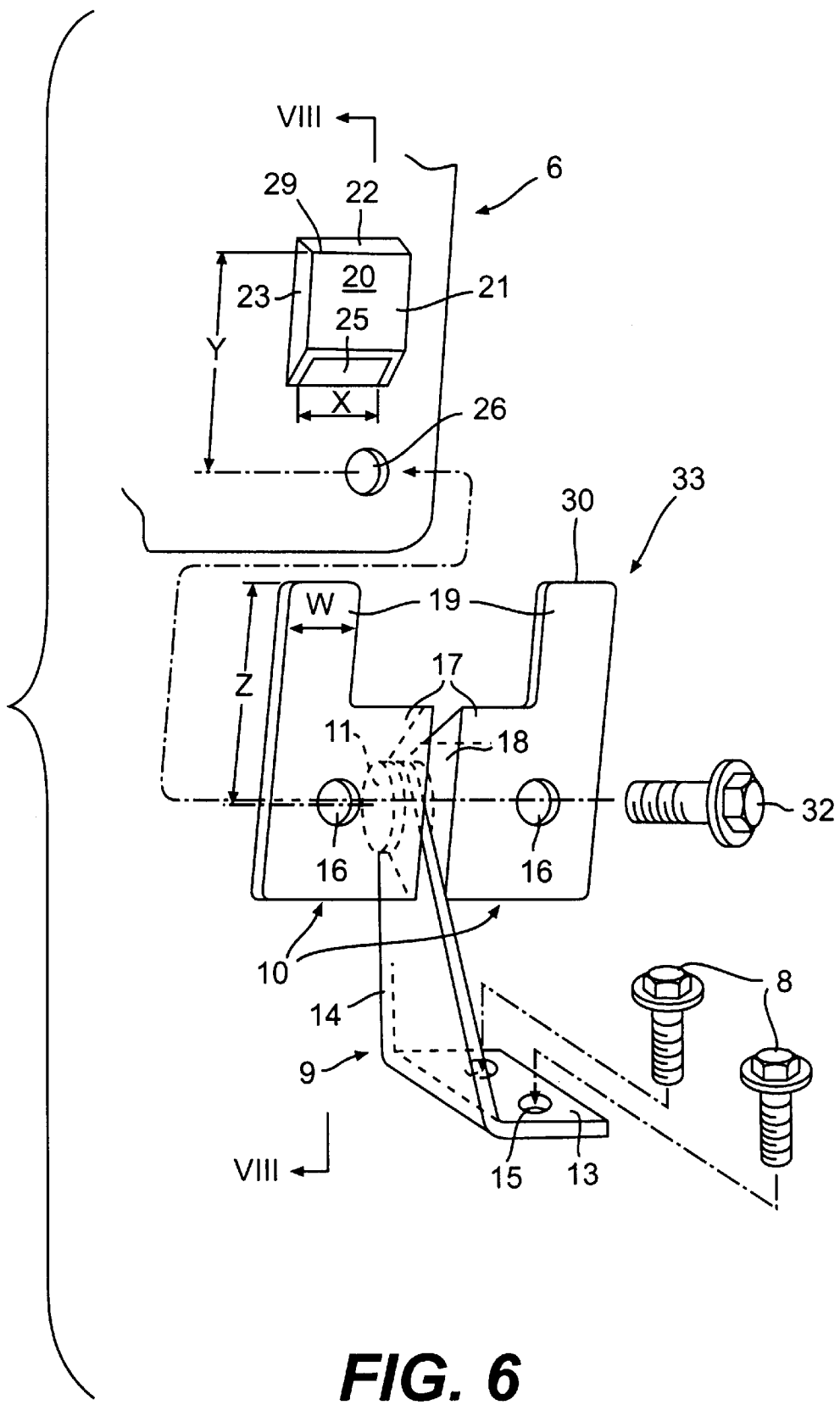
FIG. 6 is an exploded perspective view of the hinge components of FIG. 5.
Figure 7:
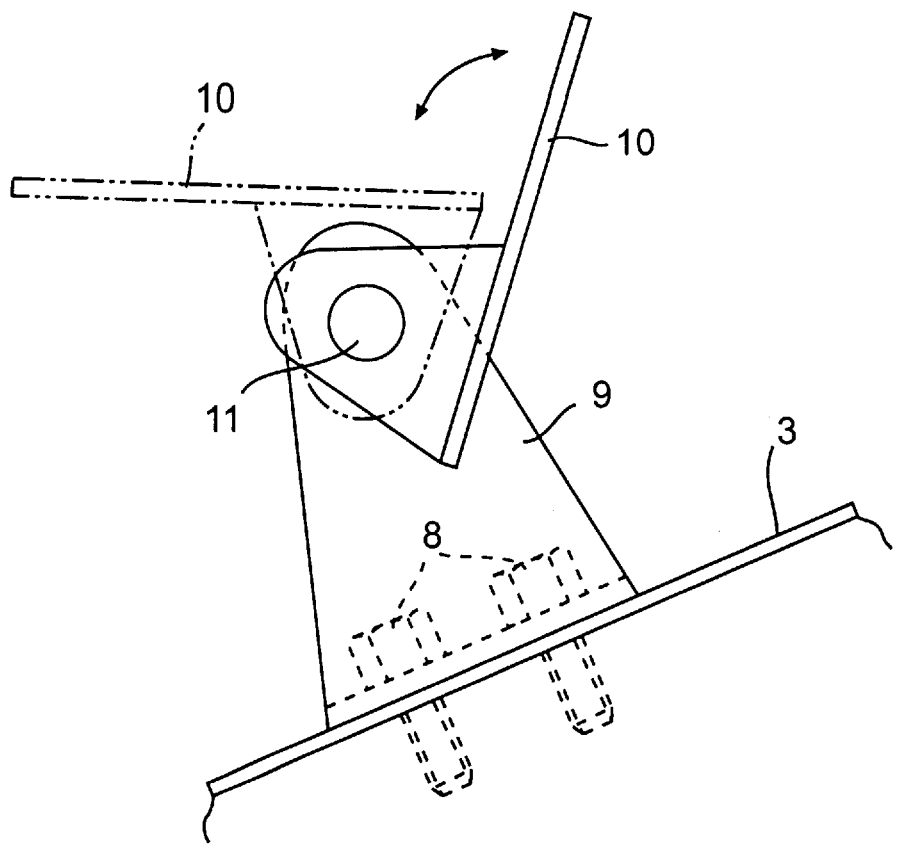
FIG. 7 is a side elevation view of the seat hinge shown in FIG. 5.

As shown in FIG. 6, the seat hinge 33 is provided with a first bracket 9 fastened by bolts to the floor panel, second brackets 10, attached on the left and right sides straddling said first bracket 9, and a pin 11 to pivotally support both brackets 9, and 10 so they may rotate relative to one another. The first bracket 9 is preferably an integral body directly in contact with the floor panel, comprising an attachment member with bolt holes 15 and a support member 14 that is essentially of triangular shape and extends up from the lateral end of said attachment member 13. Each of the second brackets 10 is also preferably an integral body comprising an attachment member 17 having secondary bolt holes 16, that is in direct contact with the corresponding rear seat back panel 6. The second bracket includes an approximately triangularly shaped support member 18 that extends orthogonally vis-a-vis the lateral end of said attachment member 17. The tip of the attachment member 17 of the second bracket 10 includes an insertion member whose width W is smaller than the overall width of the second bracket. As shown in FIG. 7, seat hinge 33 is designed so that the first bracket 9 is attached by bolts to the planar floor panel 3, and the second bracket 10 can rotate about a pin 11.

Figure 8:
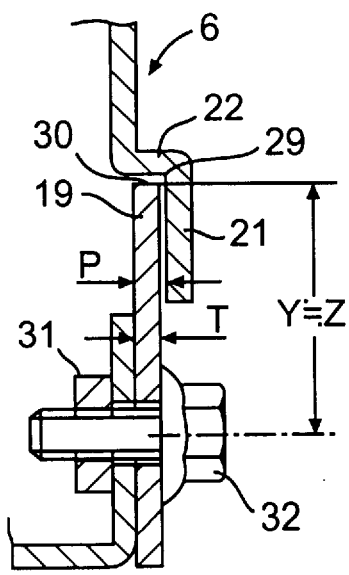
FIG. 8 is a cross section view on line VIII—VIII of FIG. 6.
Figure 9:
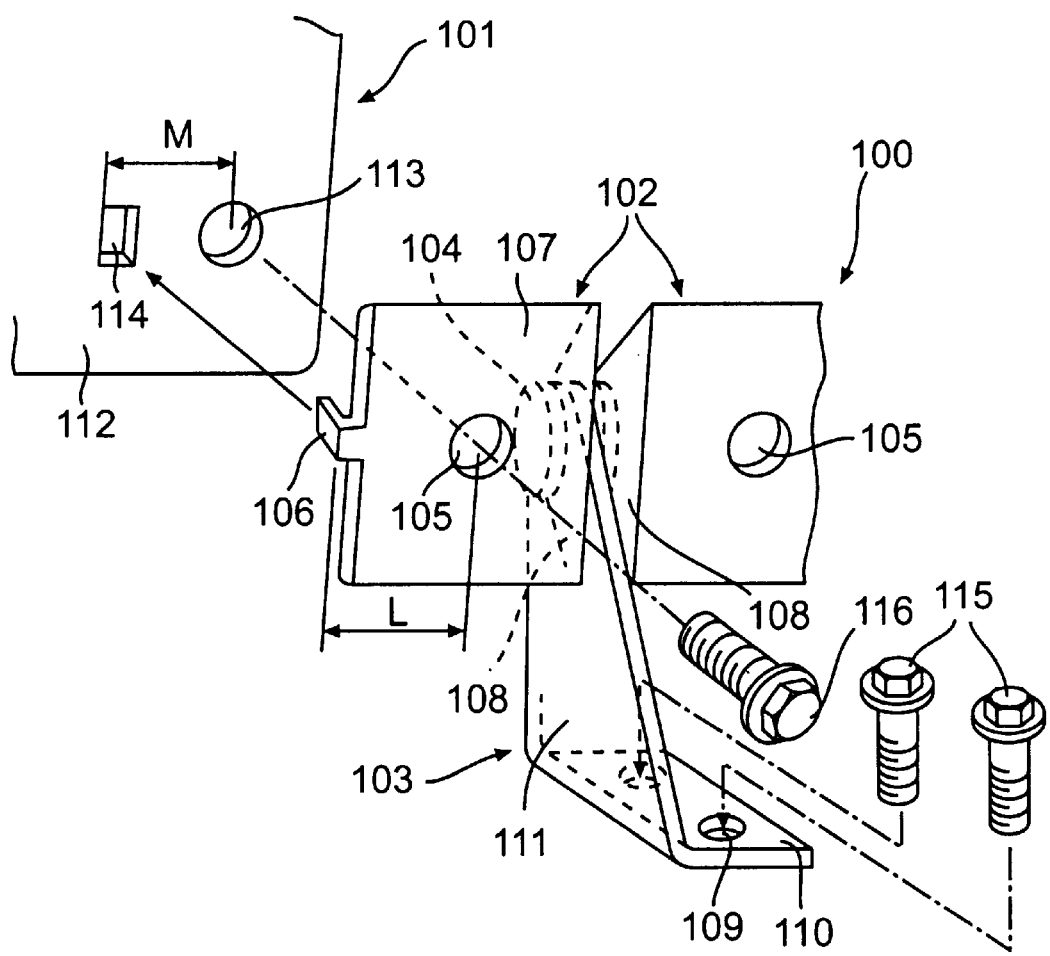
FIG. 9 is a perspective view of a conventional seat hinge and a rear seat.

As shown in FIG. 6, a substantially boxlike protrusion 20 extends backwards from each seat back panel, and forms an integral body with said rear seat back panel. The bottom of said protrusion 20 opens to form an insertion hole 25. This protrusion 20 comprises a rear face 21 approximately parallel to the rear seat back panel 6, a top face 22, and two lateral faces 23. As shown in FIG. 8, the gap P between the rear surface of said rear face 21 and the surface of the rear seat back panel 6 is approximately equal to the plate thickness T of the insertion member 19 of the second bracket 10. Also, the distance Z between the tip of the insertion member 19 of the second bracket 10 and the center of a secondary attachment hole 16 is approximately equal to the gap Y between the rear edge of the top face 22 of the aforementioned protrusion 20 and the center of a primary attachment hole 26. The width W of the insertion member 19 of the second bracket and the width X of the protrusion insertion hole 25 are formed to be approximately identical.

The procedure for attaching the rear seat back 5 to the seat hinge 33 is analogous to that discussed earlier for the first embodiment. Insertion member 19 of the seat hinge 33 is inserted into insertion hole 25 of the protrusion 20 provided in the rear seat back panel 6. After the primary attachment holes 26 of the rear seat back panel 6 and the secondary attachment holes 16 of the seat hinge 33 are aligned, bolts 32 are inserted through these attachment holes 26, 16, and are fastened. The procedure is repeated for each of the two seat backs 5.

Because of the support structure according to the invention, the primary attachment holes 26 of the rear seat back panel 6 can be substantially aligned with the positions of the attachment holes 16 of the second brackets 10 by simply inserting the insertion member 19 of the seat hinge 33 into the insertion hole 25. The process of attaching the rear seat back 5 thus becomes easy. Also, because the bolts fasten in a direction more or less orthogonal to the direction of insertion of the insertion member, insertion member 19 will not easily become dislodged from the insertion hole 25 while the bolts are being fastened.

Various transformations and modifications of the described embodiments are possible based on the technical concepts disclosed in the present invention. For example, in the embodiments of the invention described, the protrusion 20 is formed as one part with the rear seat back panel 6. However, the protrusion 20 can also be manufactured separately and later attached to the rear seat back panel 6 by commonly used means, such as welding.

As described above, the support structure for a seat back according to the present invention includes a protrusion with an insertion hole on its bottom surface the is provided on the rear surface of each seat back. The base of the seat hinge is attached to the vehicle floor panel, and an insertion member is provided on the tip of the hinge, for insertion in the insertion hole of each protrusion. By inserting the insertion member into the insertion hole of the protrusion, the seat back is supported by, the seat hinge. Because of the hinge design, when the seat back is fastened to the seat hinge, the insertion member does not easily disengage from the insertion hole.

In another embodiment according to the present invention, a protrusion having ,a top and a bottom surface is provided on the rear face of the seat back, and an insertion hole is formed on the bottom surface of said protrusion. Primary attachment holes are drilled below the protrusion, on the rear surface of the seat back. The base of the seat hinge is attached to the floor panel, and an insertion member that can be inserted into the aforementioned insertion hole is provided on the top of the hinge. Secondary attachment holes corresponding to the aforementioned primary attachment holes are drilled below the insertion member. By simply inserting the insertion member into the insertion hole of the protrusion until the tip of the insertion member abuts against the protrusion's top surface, the vertical positioning and alignment of the primary attachment holes with the secondary attachment holes is assured. In this manner assembly line workers can easily attach the seat back to the seat hinge without having to align the locations of the attachment holes by hand. Because the insertion member does not easily disengage from the insertion hole, the task of attaching the seat back to the seat hinge is simplified, even if the seat cushion is of a non-removable type. Moreover, when bolts are inserted into and fastened in the attachment holes, the load carried by the bolts is less than that in conventional arrangements because the hinge insertion member vertically holds the seat back, and therefore this invention provides also an advantage in terms of strength of the support.

In yet another embodiment according to the invention, the width of the insertion holes approximately equals the width of the insertion members. Additionally, the gap between the top face of the protrusion and a primary attachment hole approximately equals the gap between the tip of the insertion member and the secondary attachment hole. Therefore, by simply inserting the insertion member into the insertion hole of the protrusion, the tip of the aforementioned insertion member abuts the top surface of the protrusion, and the vertical position within the vehicle and alignment of the primary attachment holes with the secondary attachment holes is assured. Thus, the process of attaching a seat back to a seat hinge is simplified.

It will be apparent to those skilled in the art that various modifications and variations can be made in the seat hinge of the present invention without departing from the scope or spirit of the invention.

Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A support structure to attach a seat back of a vehicle seat to a vehicle floor panel, comprising:
    a primary insertion hole defined in a seat back rear surface;
    a protrusion extending from the seat back rear surface, the protrusion having a top face and a bottom face, and defining an insertion cavity which opens on the bottom face;
    a seat hinge having a base portion adapted to attach to the floor panel, and an insertion member extending from the seat hinge for insertion into the insertion cavity, the seat hinge defining a secondary attachment hole corresponding to at least one primary attachment hole;
    wherein, when the insertion member is inserted into the insertion cavity, the seat hinge is capable of holding the seat back vertically and the primary and secondary attachment holes are substantially in alignment.

2. A support structure to attach a seat back of a vehicle seat to a vehicle floor panel, comprising:
    a primary insertion hole defined in a seat back rear surface;
    a protrusion extending from the seat back rear surface, the protrusion having a top face and a bottom face, and defining an insertion cavity which opens on the bottom face;
    a seat hinge having a base portion adapted to attach to the floor panel, and an insertion member extending from the seat hinge for insertion into the insertion cavity, the seat hinge defining a secondary attachment hole corresponding to at least one primary attachment hole;
    wherein the primary attachment hole is located below the protrusion, and the secondary attachment hole is located below the insertion member of the seat hinge, and wherein when the insertion member is inserted into the insertion cavity, the seat hinge is capable of holding the seat back vertically and the primary and secondary attachment holes are substantially in alignment.

3. A support structure to attach a seat back of a vehicle seat to a vehicle floor panel, comprising:
    a primary insertion hole defined in a seat back rear surface;
    a protrusion extending from the seat back rear surface, the protrusion having a top face and a bottom face, and defining an insertion cavity which opens on the bottom face;
    a seat hinge having a base portion adapted to attach to the floor panel, and an insertion member extending from the seat hinge for insertion into the insertion cavity, the seat hinge defining a secondary attachment hole corresponding to at least one hole primary attachment hole;
    wherein when the insertion member is inserted into the insertion cavity, the seat hinge is capable of holding the seat back vertically and the primary and secondary attachment holes are substantially in alignment, and a tip portion of the insertion member abuts an underside of the top face of the protrusion when the insertion member is inserted into the insertion cavity.

4. The support structure according to claim 3, wherein a width of the insertion member is substantially the same as a width of the insertion cavity, and a distance between the top face of the protrusion and the primary attachment hole is substantially the same as a distance between the tip of the insertion member and the secondary attachment hole.

5. The support structure according to claim 4, wherein when the insertion member is inserted into the insertion cavity, the seat back is held vertically by the seat hinge and the primary and secondary attachment holes are aligned with each other and extend substantially horizontally.

6. A support structure to attach a seat back of a vehicle seat to a vehicle floor panel, comprising:
    a primary insertion hole defined in a seat back rear surface;
    a protrusion extending from the seat back rear surface, the protrusion having a top face and a bottom face, and defining an insertion cavity which opens on the bottom face;
    a seat hinge having a base portion adapted to attach to the floor panel, and an insertion member extending from the seat hinge for insertion into the insertion cavity, the seat hinge defining a secondary attachment hole corresponding to at least one primary attachment hole;
    wherein the base portion is pivotally attached to the insertion member, and when the insertion member is inserted into the insertion cavity, the seat hinge is capable of holding the seat back vertically and the primary and secondary attachment holes are substantially in alignment.

* * * * *

UNITED STATES PATENT AND TRADEMARK OFFICE
CERTIFICATE OF CORRECTION

PATENT NO.: 6,030,044

DATED: February 29, 2000

INVENTOR(S): Ken Kosugi, Takashi Matsuo

It is certified that an error appears in the above-identified patent and that said Letters Patent is hereby corrected as shown below:

Claim 3, col. 8, line 18, delete "hole" (first occurrence).

Signed and Sealed this

Tenth Day of April, 2001

*Attest:*

NICHOLAS P. GODICI

*Attesting Officer*      *Acting Director of the United States Patent and Trademark Office*